United States Patent [19]
Coffee

[11] 3,742,877
[45] July 3, 1973

[54] PLANTER APPARATUS

[76] Inventor: Irvin B. Coffee, Route 4, Marlow, Okla.

[22] Filed: Sept. 24, 1970

[21] Appl. No.: 75,044

[52] U.S. Cl............................ 111/6, 111/7, 111/73, 111/85, 172/157
[51] Int. Cl............................................... A01c 5/00
[58] Field of Search ....................... 111/85, 6, 7, 80, 111/73, 1, 33; 172/157, 188, 145, 177

[56] References Cited
UNITED STATES PATENTS

| | | | |
|---|---|---|---|
| 3,347,188 | 10/1967 | Richey | 172/80 X |
| 3,220,368 | 11/1965 | Gandrud | 111/73 X |
| 3,456,607 | 7/1969 | West | 111/85 |
| 3,397,748 | 8/1968 | Whitesides | 111/7 X |
| 3,437,061 | 4/1969 | Wells | 111/6 X |
| 3,158,204 | 11/1964 | Martin | 111/33 X |
| 1,348,038 | 7/1920 | Neumeyer | 111/6 X |
| 3,194,194 | 7/1965 | Phelps | 111/6 |
| 3,348,505 | 10/1967 | Smith | 111/73 |
| 2,794,407 | 6/1957 | Wist et al. | 111/7 |
| 3,316,865 | 5/1967 | Williams | 111/6 |

Primary Examiner—Robert E. Pulfrey
Assistant Examiner—Stephen C. Pellegrino
Attorney—Dunlap, Laney, Hessin and Dougherty

[57] ABSTRACT

Apparatus for planting seeds in beds and including a framework having a forward side and a rear side with a plurality of furrow forming plows carried on the forward side of the frame and alternating in a transverse direction across the frame with a plurality of bedding plates. Mounted on the central portion of the frame and depending therefrom are a plurality of pairs of planter disks which are fed with seeds to be planted from seed hoppers mounted on the upper side of the frame. The seed hoppers are controlled in their seed feeding function by rotating feeder elements which are rotated in correlation to the speed which which the frame is pulled over the ground by a towing vehicle such as a farm tractor. A herbicide distribution system is mounted on the frame between the plow blades and bedding plates at the forward side of the frame and the planting disks to the rear of these structures, so that a herbicide may be sprayed on top of the formed beds. To the rear of the planting disks, the frame carries a pair of ground engaging gauge wheels which support the frame on the ground and control the depth to which the plow blades and planting disks will penetrate the ground. Suspended from the frame and located rearwardly from the gauge wheels are a plurality of rotatably mounted pulverizing tines which function to fluff and pulverize the soil in the beds. A suitable fungicide distributing system is provided on the frame for feeding a fungicide from hoppers carried on the upper side of the rear portion of the frame to a location in close proximity to the pulverizing tines.

20 Claims, 7 Drawing Figures

INVENTOR
IRVIN B. COFFEE

BY
Dunlap, Laney, Hessin & Dougherty
ATTORNEYS

PLANTER APPARATUS

BACKGROUND OF THE INVENTION

1. Field of the Invention

This invention relates to agricultural implements, and more particularly, but not by way of limitation, to an apparatus for planting peanuts or the like in hills or beds as the planting apparatus is towed behind a farm tractor or other suitable vehicle.

2. Brief Description of the Prior Art

Many types of planting machines have previously been devised to facilitate, and reduce the time and labor involved in, planting seeds for the purpose of raising various crops. At present, little manual planting continues to be carried on, and most of the planting of row crops is now carried out by various types of planting apparatus towed behind farm tractors or similar vehicles. In the planting of some types of seeds, special care must be exercised to provide an environment for the growth of the seed which will reduce competition from grass and weeds. Moreover, some types of seeds and young plants are particularly susceptible to attack by various fungi and it is therefore usually necessary to apply at some time during the early growth of the plant, or concurrently with the planting of the seed, a fungicide which will prevent such attack, or will at least substantially reduce the susceptibility of the plant to such attack.

The peculiar mechanical requirements for providing machines which will accomplish the several functions which are entailed in each of the agronomical desideratum for most efficient crop yield have heretofore resulted in the necessity for the farmer to purchase a number of different types of machines, and to spend valuable time in carrying out first one operation, then by appropriate change of apparatus, another and successive operations. Some recent machines have undertaken to incorporate in a single apparatus, which can be moved as one unit over the ground by the provision of adequate towing power, structure capable of forming and shaping the beds for the planting of the seeds, applying a herbicide to this area, and planting the seeds—all in a single pass of the apparatus. It nevertheless has remained necessary with some crops, such as peanuts, to use several machines at different times in order to accomplish optimum planting in which the seeds are adequately protected against deleterious competitive plant growth and attacks by certain fungi. The necessity of traversing the same planted area on multiple occasions, with the intervening inconvenience of connecting and disconnecting the several different types of apparatus to the tractor, has required considerable time and effort by the farmer, and the necessity to purchase many different types of machines to accomplish the multiple functions involved has made is especially difficult for the small farmer to optimize production while maintaining a profit margin sufficient to assure an adequate income.

BRIEF DESCRIPTION OF THE PRESENT INVENTION

The present invention provides an integrated apparatus which accomplishes the overall result of planting seeds in an optimum environment for growth, and which includes structure for uniformly forming beds of proper size and shape for the deposition of seeds therein, structure for uniformly and reliably depositing seeds at the proper depth within the beds, structure for automatically applying a herbicide to the beds in the vicinity of the seeds placed therein, structure for spraying a fungicide upon the seeds after they are deposited in the earth, and tines for pulverizing and fluffing the earth around the seeds to prevent impairment of growth by impaction, or the presence of clods. The performance of the various functions ascribed to the integrated apparatus is accomplished with synchronism, and in proper sequence, during a single pass of the apparatus over the area in which the seeds are to be planted.

Broadly described, the present invention comprises a horizontally extending framework having a forward side and a rear side, and having secured to the forward side thereof hitch bracket connections for connecting the framework to the usual three-point hitch connection provided on agricultural tractors. A plurality of plow assemblies are mounted in transversely spaced relation on the forward side of the framework and are inter-connected by bedding plates. The plow assemblies cooperate with the bedding plates to form furrows spaced by beds in which the seeds are to be planted.

A herbicide distribution system is mounted on the framework rearwardly from the plow assemblies, and includes a manifold pipe extending transversely across the framework and having a plurality of downwardly extending distribution conduits positioned for distributing herbicide on the surface of the beds. A plurality of transversely spaced seed hoppers are mounted on the upper side of the framework rearwardly from the herbicide distribution system, and feed seed through discharge chutes to paired planter disks which deposit the seed at a desired depth in the length of the beds.

A fungicide distribution system is mounted on the framework to the rear of the seed hoppers and planter disks. This system includes a plurality of transversely spaced fungicide hoppers connected through suitable valving to flexible tubes which deliver fungicide to distribution heads which deposit the fungicide at the proper location in relation to seeds planted by the planter disks. The earth in the beds is then pulverized and fluffed by banks of pulverizer tines rotatably mounted in frames which are pivotally cantilevered from the main framework.

From the foregoing description of the invention it will have become apparent that an important object of the present invention is to provide a planter apparatus which is capable of efficiently planting seed in a well prepared seed bed under optimum conditions for healthy plant growth.

Another object of the invention is to provide a planter apparatus which, in one pass across a field, prepares furrow bounded seed beds, lays down a herbicide upon such seed beds, deposits seed at an optimum depth in such seed beds, fungicidally protects such seed from attack by harmful fungi, and pulverizes and fluffs the earth adjacent the seed.

An additional object of the invention is to provide a seed planting apparatus which may be utilized particularly advantageously in planting peanut seed, and which is characterized in having a long and trouble-free operating life.

Other objects and advantages of the invention will become apparent as the following detailed description of the invention is read in conjunction with the accompanying drawings which illustrate one embodiment of the invention.

DETAILED DESCRIPTION OF A PREFERRED EMBODIMENT OF THE INVENTION

Figure 1:
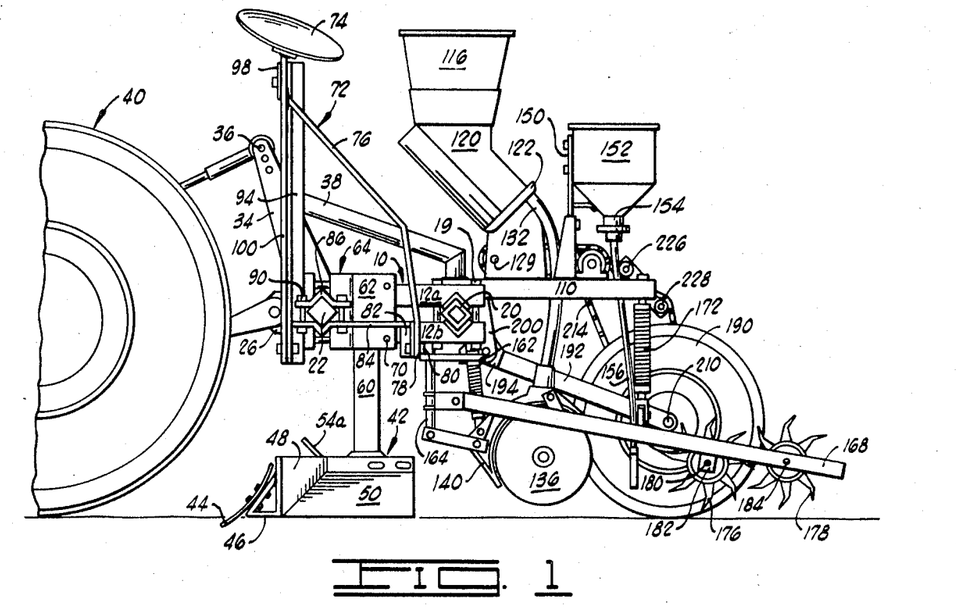
FIG. 1 is a side elevation view of the planter apparatus of the present invention, showing such apparatus connected behind an agricultural tractor.
Figure 2:
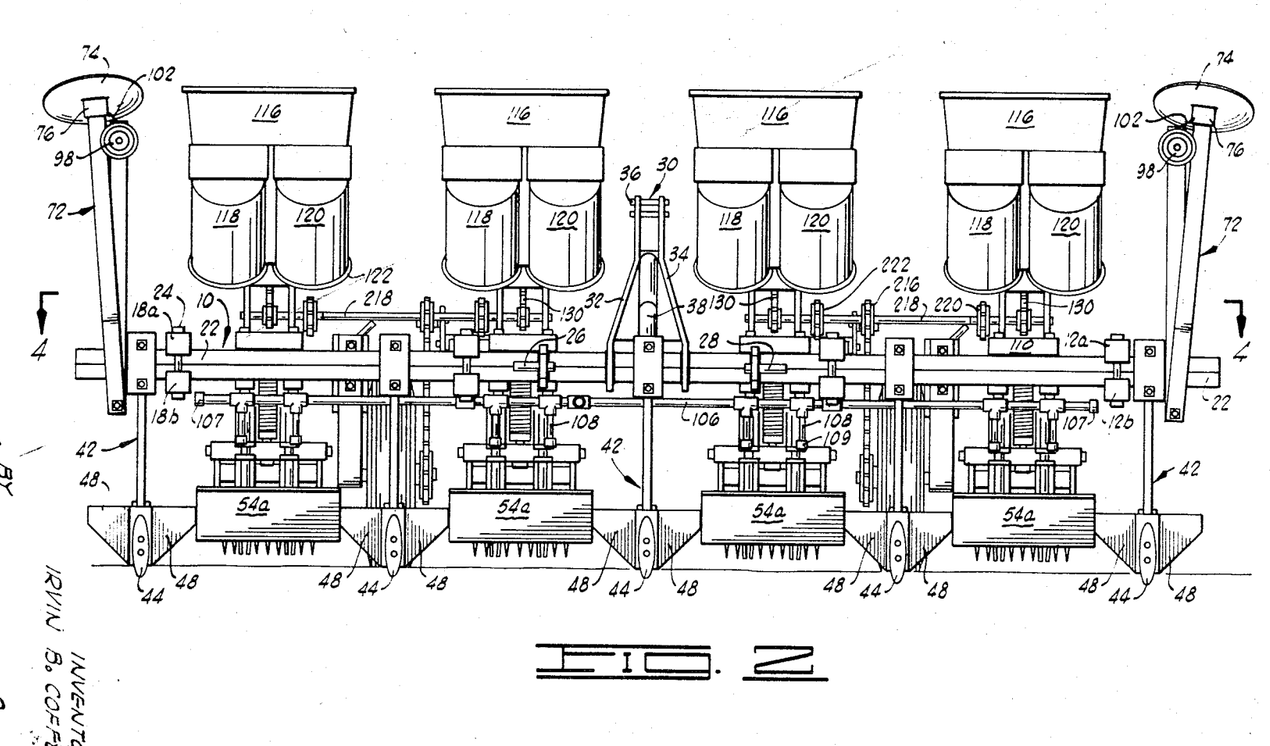
FIG. 2 is a front elevation view of the planter apparatus of the present invention.
Figure 3:
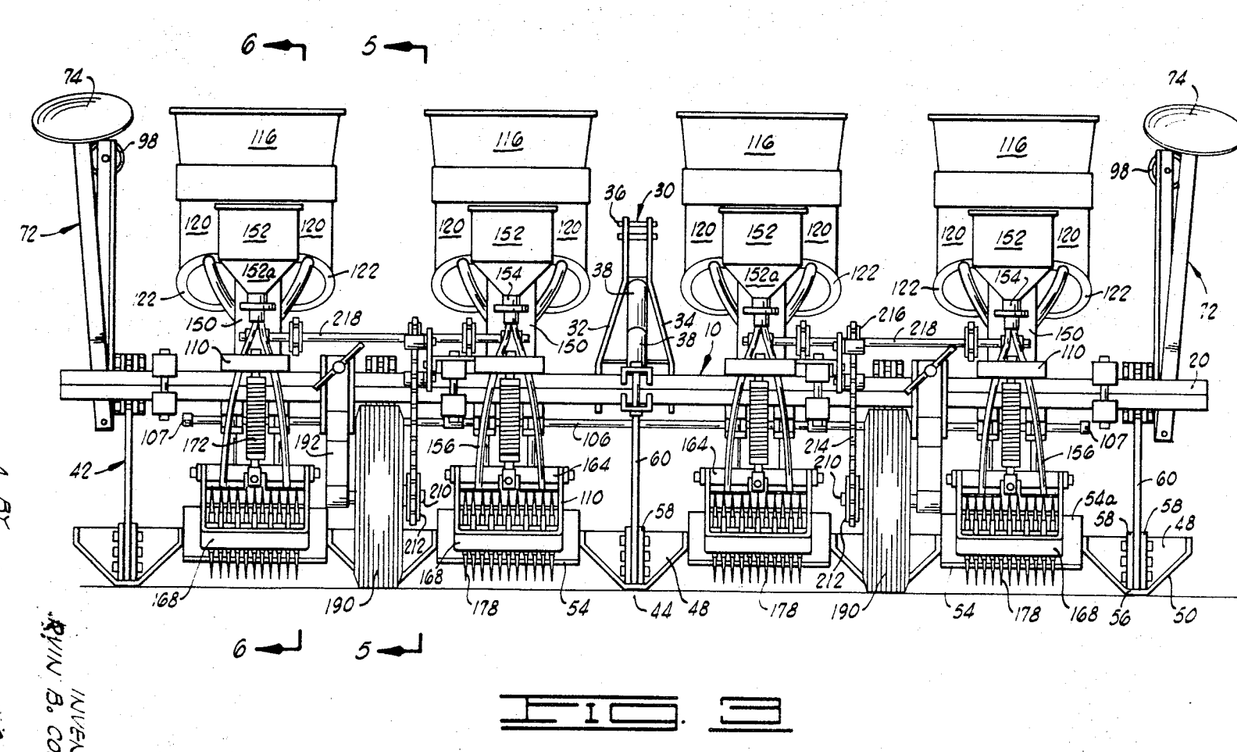
FIG. 3 is a rear elevation view of the planter apparatus of the present invention.

Referring initially to FIGS. 1-3 of the drawings, shown therein is a planting apparatus constructed in accordance with the present invention, and including a main frame designated generally by reference numeral 10. The main frame 10 includes a series of pairs of rearwardly extending bars 12a–12b; 14a–14b; 16a–16b; and 18a–18b. The pairs of bars 12–18 are secured by suitable bolts 29 and nuts to a transversely extending, rectangularly cross-sectioned main beam 20. It will be noted in referring to FIG. 1 that the main beam 20 is positioned so that one edge thereof faces upwardly, and another edge faces downwardly, with these edges or corners of this main beam engaging notches formed in the beams 12–18.

In similar fashion, a forward transverse beam 22 extends from side to side across the apparatus and between the bars which make up each pair of the bars 12–18. Each bar pair is secured to the transverse forward beam 22 by nuts and bolts 24 as shown in FIG. 2. To the framework 10 as thus constituted, substantially all other portions of the planter apparatus are mounted or secured in suitable manner as hereinafter detailed.

The planter apparatus is propelled by connection to a farm tractor or other suitable vehicle, and for the purpose of permitting such connection, a three-point hitch connection assembly is provided. This assembly includes a pair of outer hitch brackets 26 and 28 (see FIG. 2), mounted on the forward transverse beam 22, and a central hitch bracket subassembly, designated generally by reference numeral 30. The central hitch bracket assembly 30 includes a pair of upwardly and forwardly extending plates 32 and 34 which are secured at their lower ends to the transverse beam 22 and which carry a connection pin 36 extending between their upper ends. An adjusting brace 38 extends from a central portion of the plates 32 and 34 to a point of securement with the main beam 20 at the central portion thereof. The three-point hitch connection assembly is shown connected by a conventional linkage to a towing vehicle which, in the illustrated drawings, is a farm tractor designated generally by reference numeral 40.

Mounted at transversely spaced locations along the forward transverse beam 22 are a plurality of furrow forming elements or plow assemblies, designated generally by reference numeral 42. Each of the plow assemblies 42 includes a plow blade 44 attached to a mold board 46 which is secured to the forward edges of a pair of rearwardly diverging wing plates 48. The rearwardly diverging wing plates 48 are welded to a pair of parallel side plates 50 which curve inwardly and downwardly toward each other in their lower portions, and have parallel, vertically extending portions at their upper sides. At the line of intersection of the inwardly and downwardly tapered lower portion of each side plate 50 with the vertically extending upper portion thereof, adjacent side plates of each adjacent pair of plow assemblies 42 are welded to a bedding plate 54. Each of the bedding plates 54 is therefore spaced vertically from the lowermost portion of the side plates 50 and the lowermost portion of the wing plates 48. More importantly, the bedding plates are elevated with respect to the pointed lower end of the blades 44.

The bedding plates 54 extend transversely between adjacent plow assemblies 42 and have formed at the forward portions thereof an upwardly and forwardly extending portion 54a. This portion of each of the respective bedding plates, as will be subsequently explained, functions to smooth and level earth by forcing the earth under the elevated bedding plate so as to form a flat surface extending between furrows formed by the plow blades 44 as the apparatus is moved forward. The bedding plates are preferably bolted to the plow assemblies 42 so that they may be removed from between adjacent plow assemblies, and shorter bedding plates inserted, or the spacing on the assembly altered as may be desirable.

Figure 5:
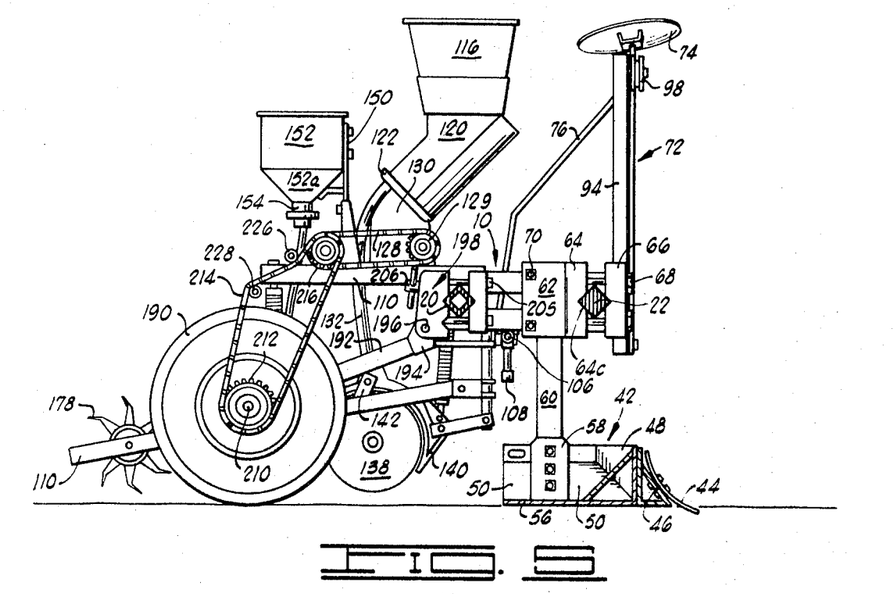
FIG. 5 is a sectional view of the planer apparatus taken along line 5—5 on FIG. 3.

Extending between and interconnecting the lowermost edges of the side plates 50 is a bottom plate 56. The bottom plate functions in conjunction with the wing plates 48 and side plates 50 to widen the furrow initially opened by the blades 44. The bottom plate 56 also functions as the support for a pair of transversely spaced bracket plates 58 (see FIG. 5). The paired bracket plates 58 in each plow assembly 42 function to receive between them an upwardly extending mounting bar 60. The mounting bar 60 is a relatively flat plate and is used for mounting each plow assembly 42 on the forward transverse beam 22.

The upper end of each mounting bar 60 in each plow assembly 42 is passed between a pair of transversely spaced, substantially parallel mounting plates 62 which are welded to the rear side of a bight portion 64a of a U-shaped mounting bracket 64. The legs 64b of the U-shaped mounting bracket 64 have V-shaped notches 64c formed therein to receive one corner or edge of the forward transverse beam 22. Disposed on the opposite side of the forward transverse beam 22 in alignment with the mounting bracket 64 is a cooperating U-shaped mounting bracket 66. Bolts 68 are extended through the mounting brackets 64 and 66 to support the mounting plates 62 on the beam 22. The upper end of the mounting bar 60 is then frictionally clamped between the plates 62 by means of suitable bolts 70. It will be perceived that this arrangement permits the vertical position of the several plow assemblies 42 to be adjusted by sliding the mounting bars 60 upwardly and downwardly between the mounting plates 62. It will further be noted that by loosening the bolts 68 extended between the mounting brackets 64 and 66, each of the plow assemblies 62 may be moved transversely along the forward transverse beam 20 to adjust the spacing between individual mounting assemblies, or to move the entire array of plow assemblies 42 relative to the towing vehicle and other elements of the planting apparatus hereinafter described.

Mounted at each end of the forward transverse beam 22 are a pair of row marker assemblies designated generally by reference numeral 72. Each row marker assembly 72 includes a marker disk 74 which is mounted upon one end of a support rod 76. Each support rod 76 has an end secured to a pivot plate 78 which is pivotally connected by a pivot pin 80 to an angle bracket 82 mounted on the rear end of a support arm 84. The mounting arm 84 extends forwardly and has a V-shaped indentation formed therein for receiving the lower edge of the forward transverse beam 22. A cooperating clamp 86 mounts across the top of the forward transverse beam 22, and has a V-shaped indentation formed therein for receiving the top edge of the forward beam. The clamp 86 cooperates with the mounting arm 84 so that when the clamp and arm are bolted together by means of bolts 90, the mounting arm is held rigidly to the forward transverse bar 22. Welded to the forward end of the mounting arm 84 is an upwardly extending angle iron member 94. On a forwardly facing side, the angle iron member 94 carries a pulley or sheave 98 which is mounted for rotation about a horizontal axis. Just outwardly of the sheave 98, a vertically extending support member 100 extends upwardly and has its upper end secured to a portion of the support rod 76 just below the marker disk 74. The lower end of the support member 100 is pivotally secured to the forward flange of the angle iron 94. A cable or other suitable flexible member 102 is wrapped around the sheave 98 and secured to the support member 100 so that by paying out the cable from the sheave 98, the support member 100 and the support rod 76 may be pivoted about their respective horizontal axes to lower the marker disk 74 outwardly from the frame 10, and permit the disk to come in contact with the earth. The marker disk 74 functions in a well-known manner to provide a mark in the earth extending parallel to the path of travel of the tractor and planter apparatus so that the farmer may be appraised of that area which has been covered in a single pass of the planter apparatus. The row marker assemblies 72 located at opposite ends of the forward transverse beam 20 are identically constructed, and function in the same way. It will be noted that by loosening the bolts 90, so that the bracket 88 may be moved apart from the mounting arm 84, the respective row marker assembly 72 may be moved along the forward transverse beam 22 to adjust the spacing between the marks formed by the marking disks 74 when they are lowered into contact with the earth.

Secured beneath the lowermost of the bars in each pair of bars 12-18 is a transversely extending herbicide manifold pipe 106. Any suitable type of brackets may be used for securing the herbicide manifold pipe 106 beneath the lowermost of the bars 12-18, and that the opposite ends of the manifold pipe are closed by suitable caps 107 as shown in FIG. 2. Transversely spaced along the manifold pipe 106 are a plurality of downwardly extending herbicide distribution conduits 108 which function to convey a herbicide from the manifold pipe 106 to spray nozzles located on the lower ends of the distribution pipes 108. A supply line connection 109 is connected to the central portion of the herbicide manifold pipe 106 for receiving herbicide from one or more drums which may be suitably carried on the tractor 40.

Figure 6:
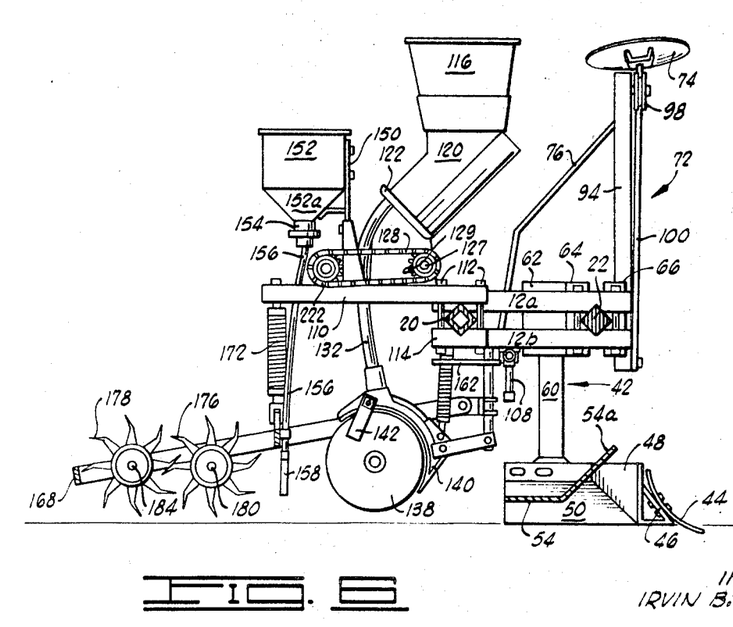
FIG. 6 is a sectional view of the planter apparatus taken along line 6—6 on FIG. 3.
Figure 7:
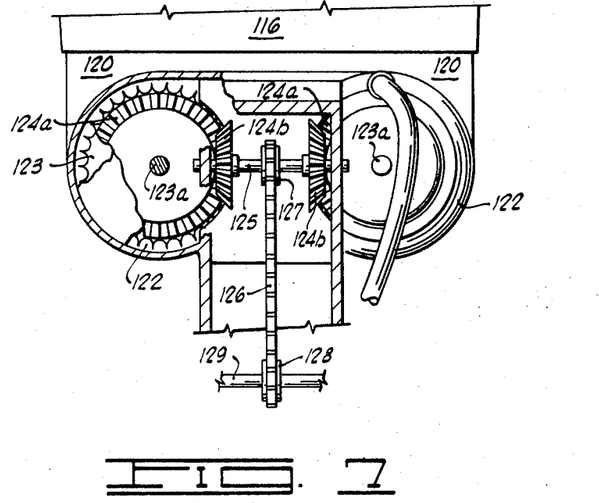
FIG. 7 is a detail view illustrating certain structure forming a part of the seed planting structure of the planting apparatus.

Referring to FIG. 6 of the drawings, there is shown a rearwardly extending planter hopper support beam 110 which has a relatively broad horizontally extending upper surface, and which extends rearwardly from the transversely extending main beam 20. At its forward end, the planter support beam 110 is secured by suitable bolts 112 to the transverse main beam 20 by the use of a cooperating bracket bar 114 extended beneath the main beam. It will be noted in referring to FIG. 4 that a plurality of the planter support beams 110 are provided and extend rearwardly from the transversely extending main beam 20 in alignment with the bedding plates 54 disposed between the several plow assemblies 42 at the forward side of the framework. Each of the planter support beams 110 supports a planter assembly 115 which includes a seed hopper 116 which feeds through dual seed canisters 120 to an annular pickup groove 122 located at the lower end of each canister. Disposed within the planter assembly 115 and cooperating with the pickup groove 122 are rotating pickup disks 123 which are notched at the outer periphery to pick up one seed, such as a peanut, in each notch of each disk. As shown in FIG. 7, the rotating pickup disks 123 are each keyed to a shaft 123a which extends rearwardly from the respective planter assembly and carries at its end outside the assembly, a bevel gear 124a which is driven by a meshing bevel gear 124b carried on a shaft 125. The shaft is driven in rotation by a chain 126 which engages a sprocket 127 keyed thereto. The chain 126 also engages a sprocket 128 keyed to a shaft 129 which is driven in rotation by a chain 130 engaging another sprocket 131 carried thereon.

The seeds picked up by the pickup disks 123 during each revolution are discharged into a flexible conduit 132 which carries the seed to a pair of cooperating planter disks 136 and 138. The planter disks 136 and 138 are paired, and there are two pairs of disks disposed behind, and in alignment with, each of the bedding plates 54. The construction of the planter disks 136 and 138, and the manner in which they cooperate to receive and deposit seeds in the earth is conventional and well understood in the art. It may be pointed out that suitable structure is provided in conjunction with the planter disks 136 and 138 to support them for rotation about a horizontal axis, and to space the disks in each pair apart from each other. To achieve the latter function, a spacer device 140 is disposed at one side of the disks to effect the desired spacing. It may also be pointed out that there is provided at the side of each of the disks 136 and 138 and in contact therewith, a wiper finger 142 which functions to maintain the outer face of each disk in a clean state, and prevent choking and clogging with mud from occurring.

Extending upwardly from the rear portions of the planter support beams 110 are hopper supporting standards 150. The lower ends of these standards 150 are welded or otherwise suitably secured to the hopper support beams 110, and the upper ends of each standard is bolted to a fungicide hopper 152. Each fungicide hopper 152 has a pyramidally shaped lower portion 152a which feeds through a throat 154 in which is located a solenoid valve (not shown). The solenoid valve is operated by electrical current which is controlled from the tractor, and is open and closed to facilitate the dispensation of fungicide from the hopper 152 through the throat 154. The fungicide, after passing through the throat 154, enters a flexible tubing 156, and is carried by this tubing to a flared spreader head 158 located at the lower end of the tubing, and rearwardly from the pairs of cooperating planter disks 136 and 138. It will be noted that two pairs of flexible tubes 156 are connected to each throat 154. The tubes 156 pass through openings in the hopper support beam 110, and the flared spreader head 158 disposed at the lower end of each tube is retained in a fixed position relative to the planter disks 136 and 138 in a manner hereinafter described.

Figure 4:
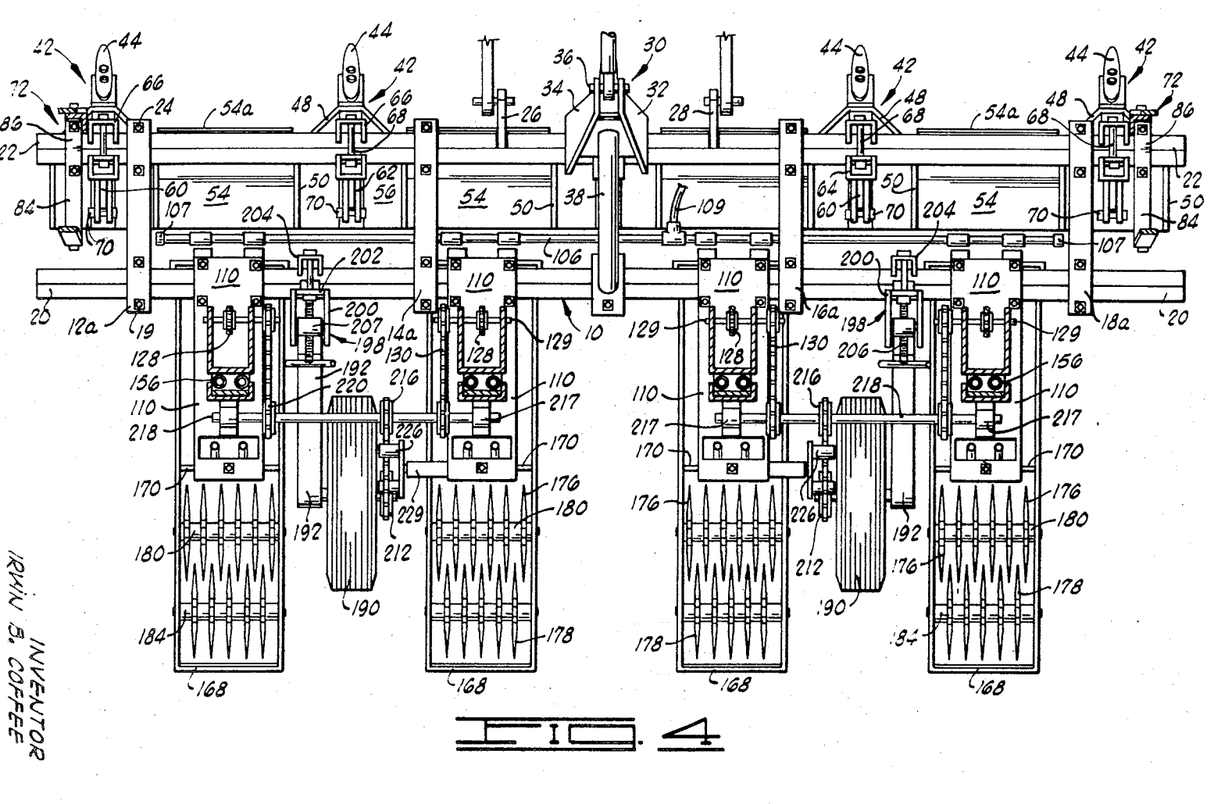
FIG. 4 is a sectional view of the planter apparatus of the invention taken along line 4—4 on FIG. 2.

Supported beneath the lowermost of the bars in each of the pairs of bars 12–18 in the frame 10 is a transversely extending plate 162. The transversely extending plate 162 supports brackets 164 utilized for pivotally supporting a plurality of pulverizer frames 168. As shown in FIG. 4, each of the pulverizer frames 168 is U-shaped in configuration having the ends of its legs pivotally connected by bolts or other suitable elements to the brackets 164 and extending rearwardly and downwardly from the pivotal axes thereof. Midway of each pulverizer frame 168, a cross bar 170 extends between the legs of the frame and functions as an anchor point for a helical spring 172 which is connected between the cross bar 170 and the rear end of the hopper support beam 110. The transverse bar 170 also has mounted thereon, each of the flared spreader heads 158 into which fungicide is discharged from the flexible tubes 156.

Mounted in the rear end portion of each of the pulverizer frames 168 are a plurality of pulverizer tines. The pulverizer tines are disposed in two transversely offset banks, with the tines in one bank being designated by reference numeral 176, and the tines in the other bank being designated by reference numeral 178. It will be noted that the tines in the bank 176 are positioned forwardly of the tines in the bank 178, and that the tines in bank 176 are keyed to a shaft 180 mounted in bearing blocks 182 for rotation about a horizontal axis. The tines in the bank 178 are keyed to a shaft 184 which is journaled in the legs of the pulverizer frame 168.

It will be noted that the pulverizer tines in the two banks 176 and 178 disposed between the legs of each of the several pulverizer frames 168 are positioned in front to rear alignment with the planter disks 136 and 138 in each of the paired sets of these disks, and are also in line with the bedding plates 54. The purpose of this alignment will be better understood as the operation of the planter apparatus of the invention is hereinafter described. It may further be noted that the mounting arrangement of the pulverizer frames 168 and the pulverizer tines carried thereby is such that the tines and their respective frames are free floating, and they may move upwardly and downwardly about their horizontal pivotal axes. The springs 172, however, function to limit the extent to which the frames 168 will pivot downwardly so that the depth to which the tines will penetrate can be controlled, and, moreover, the tines will be prevented from descending to a level low enough to interfere with over-the-road travel at such times as the gauge wheels, hereinafter described, are lowered into a position such that the apparatus is adapted for over-the-road travel or cross-country transport.

Disposed at a location on the rear side of the planter apparatus, and between adjacent pairs of pulverizer frames 168 are a pair of gauge wheels 190. Each of the gauge wheels 190 is pivotally supported in cantilever fashion at the rear end of a gauge wheel supporting arm 192 which extends forwardly and is inclined upwardly from the axle of the respective gauge wheel which it carries. At its forward end, each of the supporting arms 192 is connected to a T-shaped mounting bracket 194 which is connected by a pivot pin 196 to a bifurcated clevis assembly 198. Each clevis assembly 198 includes a pair of substantially parallel side plates 200 which are interconnected by a connector plate 202 (see FIG. 4). The side plates 200 each have a pair of aligned V-shaped notches extending thereinto from the forward edge of the respective side plates to receive the rear edge of the transversely extending main beam 20. The provision of two of the V-shaped notches in each of the side plates 200, with the paired notches in the two side plates being spaced vertically from each other permits a vertical adjustment to be made of each clevis bracket assembly 198 to further adjust the vertical position of the gauge wheels 190 on the framework 10.

On the opposite side of the transversely extending main beam 20 from the clevis bracket assembly 198 is a cooperating locking bracket 204 which is of generally U-shaped configuration, and which functions to receive bolts 205 passed through the plate 202 of the clevis bracket assembly. The locking bracket 204 may be used in cooperation with such bolts to lock the clevis bracket assembly 198 to the transversely extending main beam 20. To facilitate adjustment of the vertical position of the gauge wheels 190, an adjusting screw 206 is extended through a block 207 carried at the upper end of the T-shaped bracket 194, and the adjusting screw has one end bearing against the plate 202 of the clevis bracket assembly 198. It will be perceived in referring to FIGS. 4 and 5 that when each adjusting screw 206 is extended further through the threaded block which receives it, the T-shaped bracket 194 and the gauge wheel support arm connected thereto are pivoted downwardly to force the respective gauge wheel 190 to a lower vertical position. This adjustment of the position of the gauge wheels 190 has the effect of elevating the planter disks 136 and 138 and the plow assemblies 42 in relation to the ground so that the seeds are not planted as deeply. On the other hand, when the adjusting screws 206 are backed out of the threaded blocks 207 through which they extend, this permits the gauge wheels 190 to ride higher in relation to the remainder of the planter apparatus, and thus permits the planter disks 136, 138 and the plow assemblies 42 to penetrate the earth to a greater depth.

The gauge wheels 190 are mounted on their respective supporting arms 192 by means of stub shafts or axles 210. On the opposite side of each gauge wheel 190 from the respective supporting arm 192, each stub shaft or axle 210 rotatably carries a sprocket 212 which is keyed to the respective gauge wheel for rotation with the gauge wheel about the stub shaft. The sprockets 212 each engage a drive chain 214. Each of the drive chains 214 passes upwardly over a sprocket 216 which is keyed to a shaft 218 extending between, and journaled, in journal blocks 217 mounted upon adjacent pairs of the planter box supporting beams 110 as best illustrated in FIG. 4. Also keyed to each of the shafts 218 are sprockets 220 and 222. These sprockets engage the chains 130 which pass over the sprockets 131. As previously explained and illustrated in FIG. 7, one of the sprockets 131 is operatively associated with each pair of the seed planter assemblies, each of which includes one of the seed hoppers 116, and the function of each sprocket 131 is to transmit drive from the chain 130 to the shaft 129 which controls the rotating disks located inside of each planter assembly and cooperating with the groove 122 to pick up and discharge seeds into the several tubular members 132. It will thus be perceived that the rate at which seeds are discharged between the planter disks 136 and 138 in each pair of these disks is controlled by the speed of the planter apparatus over the ground, and is determined by the speed at which the gauge wheels 190 in contact with the ground undergo rotation. It may further be pointed out that the drive chains 214 driven from the sprockets 212 associated with each gauge wheel 190 are passed over idler rollers 226 and 228 which are carried by suitable brackets 229 welded to the rear portions of each of the hopper support beams 110.

OPERATION

In the operation of the planter apparatus of the invention, the apparatus is connected to the tractor vehicle 40 by the conventional three-point hitch connection which includes the outer hitch brackets 26 and 28 carried on the forward transverse beam 22, and the central hitch bracket subassembly 30. As is well understood in the agricultural field, the entire planter apparatus may be elevated with respect to the ground by the use of these hitch brackets, and the three-point connection to the tractor, in combination with the control afforded by the adjustability of the gauge wheels 190, facilitates adjustment of the entire planter apparatus and its several parts in relation to the ground as may be desired for over-the-road travel or for a particular planting operation.

With the planter apparatus connected to the tractor, forward motion of the tractor pulls the planter apparatus across the field and, in doing so, accomplishes the several functions of the planter apparatus hereinbefore described. Thus, as the planter apparatus traverses the earth, the plow assemblies 42 mounted on the forward side of the frame by adjustable attachment to the forward transverse beam 22 function to plow the earth, forming transversely spaced furrows. The plow blades 44 penetrate the earth to form the described furrows, and the spacing between furrows may be adjusted due to the adjustability of the plow assemblies 42 along the forward transverse beam 22. The earth between the furrows is smoothed and formed up in beds by the bedding plates 54 which extend continuously and in an uninterrupted fashion between the plow assemblies 42. The upwardly tapered forward extending portion 54a of each of the bedding plates 54 functions to direct the piled up earth formed by the plow blades 44 under the flat bedding plates 54 so that a perfectly level and flat upper surface of the seed beds is formed by the several bedding plates.

Before departing from the discussion of the plow assemblies 42, it should further be pointed out that these assemblies may be adjusted in a vertical sense by loosening the bolts 70 which extend between the parallel mounting plates 62 to permit the mounting bar 60 of each plow assembly 42 to be shifted upwardly between the parallel mounting plates. When the vertical setting of each plow assembly 42 which is desired is reached, the nuts on the bolts 70 may then be retightened to secure the respective plow assemblies in these positions.

It may be noted at this point that during the traversal of the field by the planter assembly of the invention, it will usually be desirable to lower the row marker assemblies 72 so that the marker disks 74 on each contacts the earth on opposite sides of the planter apparatus. These marker disks 74 make easily discernible marks in the earth to indicate specifically to the farmer the portion of the land which has been traversed by the planter apparatus, and to further indicate to the tractor operator where the next traversal of the field in the opposite direction should be made. The row marker assemblies are lowered by the use of the cables 102 which are unreeled from the sheaves 98. As shown in the drawings, such as FIG. 2, the row marker assemblies are shown in their retracted or inoperative positions.

As the beds between adjacent furrows are formed by the plow assemblies 42 and the bedding plates 54, a herbicide is sprayed on top of these beds by means of the herbicide distribution system. Thus, herbicide is delivered from suitable tanks mounted on the tractor through the supply line connection 109 to the herbicide manifold pipe 106. From this pipe, herbicide is directed downwardly through the herbicide distribution conduits 108 and is sprayed on the beds immediately behind the bedding plates 54. This function of the planter assembly is, of course, carried out for the purpose of controlling undesirable plant growth which would otherwise be competitive with the growth of plants from the seeds which are to be deposited in the earth by the planter.

Immediately after herbicide has been sprayed on the surface of the beds formed by the bedding plates 54, seeds delivered from the several seed hoppers 116 are implanted in the earth by the planting action of the planter disks 136 and 138. The manner in which these paired disks operate to deposit seeds in the earth is well understood in the art. However, in the case of the present invention, the wiper fingers 142 function to maintain the disks in a dirt-free state so that they may continue to operate without the necessity for cleaning over longer periods of time. It will be noted that two of the pairs of planter disks 136 and 138 are disposed in transversely spaced relation to each other behind each of the bedding plates 54 so that there are two rows of the seeds planted within each of the beds. The planter disks 136 and 138 may be vertically adjusted with respect to the framework 10, and may also be adjusted in their transverse spacing by reason of their adjustable mounting on the framework. The depth to which the planter disks 136 and 138 penetrate the earth can also be adjusted by adjustment of the position of the gauge wheels 190 as hereinafter explained.

After the seeds have been deposited in the earth, it is desirable in the case of some seeds, such as peanuts, to apply a fungicide in close proximity to the seed in order to prevent attack of the seeds and young plants by deleterious fungi. To this end, the fungicide distribution system includes in the planter apparatus of the present invention is provided, and functions to deliver fungicide from the fungicide hoppers 152 to the flexible tubes 156. The tubes 156 terminate in the flared spreader heads 158 located at their lower ends. By this means, a fungicide may be distributed on top of the seed beds immediately over the planted seeds by alignment of the spreader heads 158 with the paired planter disks 136 and 138. The amount of fungicide which is laid down on top of the seed beds can be closely controlled by means of the valving located within the throats 154 of the fungicide distribution systems. The valving is controlled in its degree of opening by the tractor operator.

Following behind the fungicide distribution system on the planter apparatus are the banked pulverizer tines 176 and 178. The frames 168 which rotatably support these tines are free floating and are suspended at the lower end of the springs 178 from the planter hopper support means 110. The frames 168 supporting the pulverizer tines 176 and 178 may thus move upwardly in response to variations in the surface character of the terrain, but are limited in the extent to which they may move downwardly. Thus, during over-the-road transport, the frames 168 and the tines they carry may be elevated completely free of contact with the ground so that no interference with such transport is afforded by the tines.

It will be noted in referring particularly to FIG. 4 that the tines 176 and 178 in the two banks of tines are staggered so that a more complete pulverization and fluffing of the earth in the seed beds can be accomplished. It will further be noted that the tines in the two banks are located directly behind the bedding plates 54 and behind the paired planter disks 136 and 138 which function to deposit the seed in the beds. Thus, large clods of the earth are pulverized or disintegrated by the pulverizer tines which chop and cut the earth by their rotation while in contact therewith. Moreover, the tines function to aerate the earth around the seeds and thus further permit better penetration of the fungicide and herbicide which has been applied.

The relation of the earth contacting elements which include the plow assemblies 42 and the planter disks 136 and 138 (and also to a lesser extent the pulverizer tines 176 and 178) can be adjusted and controlled to a desired extent by adjustment of the position of the gauge wheels 190 in relation to the rest of the apparatus. For the purpose of elevating the gauge wheels in relation to the framework 10, the adjusting screws 206 may be screwed further through the threaded blocks 207 and into the transverse connector plates 202 to pull the T-shaped mounting brackets 194 further forward at their upper ends and thus pivot the supporting arms 192 upwardly about their horizontal pivotal axes. With the raising of the gauge wheels 190 in this manner, the planter disks 136 and 138 and the plow assemblies 42 are permitted to move further down into the earth under the weight of the apparatus before the weight is received and taken by the gauge wheels.

From the foregoing description of the invention, it is believed that it will be apparent that the planter apparatus of the invention is a versatile, compact and highly utilitarian apparatus which can be used to accomplish all of the functions necessary for complete and optimum planting of seeds during a single pass across a field. The apparatus is relatively easily maintained, is mechanically sturdy in construction, and is characterized in having a long and trouble-free operating life. Although a preferred embodiment of the invention has been herein described, it is to be understood that various changes and innovations in the mechanical elements included in the structure, and in their arrangement relative to each other, can be effected without departure from the basic principles of the invention. Changes and innovations of this type are therefore deemed to be circumscribed by the spirit and scope of the invention except as the same may be necessarily limited by the appended claims or reasonable equivalents thereof.

What is claimed is:

1. A planting apparatus comprising:
   a framework having a forward side and a rear side;
   a plurality of plow assemblies mounted on the forward side of said framework and transversely spaced thereacross for making spaced furrows in the earth;
   bedding plates mounted between said plow assemblies with each bedding plate extending between a pair of adjacent plow assemblies for forming seed beds between furrows;
   a fluid distribution system mounted on said framework rearwardly from said plow assemblies and extending transversely on said framework for distributing from a common source fluid agronomical agents on soil;
   seed hoppers mounted on the upper side of said framework;
   planter disks supported on said framework at locations immediately rearwardly from said distribution system and in alignment with said bedding plates;
   means for conveying seeds from said seed hoppers to said planter disks;
   means for placement of a protective chemical immediately over seeds planted by said planter disks; and
   soil pulverizer means connected to said framework and extending downwardly and rearwardly therefrom in alignment with said bedding plates.

2. Planting apparatus as defined in claim 1 and further characterized as including gauge wheel assemblies adjustably mounted on said frame and projecting downwardly and rearwardly therefrom.

3. A planting apparatus as defined in claim 1 wherein said means for placement of a protective chemical comprises:
   hopper means mounted on said framework rearwardly from said seed hoppers for containing said protective chemical;
   spreader heads mounted on said pulverizer means; and
   tubular means for conveying said protective chemical from said hopper means to said spreader heads.

4. Planting apparatus as defined in claim 1 and further characterized to include row marker assemblies pivotally mounted on opposite sides of said framework.

5. Planting apparatus as defined in claim 1 wherein said framework comprises:
   a transversely extending main beam;
   a transversely extending forward beam positioned forward of said main beam and extending substantially parallel thereto; and
   a plurality of pairs of bars adjustably inter-connecting said main beam and forward beam.

6. Planting apparatus as defined in claim 2 and further characterized as including seed feeding means connected between said seed hoppers and said gauge wheel assemblies for controlling the rate at which seeds are discharged from said seed hoppers into said conveying means in response to the speed of rotation of said gauge wheels in said assemblies in contact with the ground.

7. Planting apparatus as defined in claim 1 wherein said fluid distribution system comprises:
   a manifold pipe extending transversely of said framework; and
   a plurality of distribution conduits extending downwardly from said manifold pipe immediately ahead of said planter discs.

8. Planting apparatus as defined in claim 5 and further characterized as including a plurality of transversely spaced, substantially horizontal hopper support beams extending rearwardly from said framework and having said seed hoppers secured to the upper side thereof, said hopper support beams having forward ends secured to said transversely extending main beam.

9. Planting apparatus as defined in claim 2 wherein each of said gauge wheel assemblies comprises:
   a gauge wheel supporting arm having a forward end pivotally connected to said framework;
   means for adjusting the inclination of the gauge wheel supporting arm with respect to the horizontal; and
   a gauge wheel rotatably mounted on the opposite end of said supporting arm from the end thereof pivotally connected to said framework.

10. A planting apparatus comprising:
    a framework having a forward side and a rear side;
    a plurality of plow assemblies mounted on the forward side of said framework and transversely spaced thereacross for making spaced furrows in the earth;
    bedding plates mounted between said plow assemblies with each bedding plate extending between a pair of adjacent plow assemblies for forming seed beds between furrows;
    a fluid distribution system mounted in said framework rearwardly from said plow assemblies and extending transversely on said framework for distributing fluid agronomical agents on soil from a common source;
    seed hoppers mounted on the upper side of said framework;
    planter disks supported on said framework at locations rearwardly from said distribution system and in alignment with said bedding plates;
    means for conveying seeds from said seed hoppers to said planter disks;
    means for placement of a protective chemical immediately over seeds planted by said planter disks;
    a plurality of elongated pulverizer frames each pivotally connected at one end to said frame for pivotation about horizontal axes to raise and lower the other end of said pulverizer frames; and
    pulverizer tines rotatably mounted in each of said pulverizer frames at said other end of said pulverizer frames for rotation about horizontal axes.

11. Planting apparatus as defined in claim 10 wherein each of said pulverizer frames is of U-shaped configuration having parallel legs each pivotally connected at one end to said framework;
    and wherein there are two banks of said tines rotatably mounted between the legs of each of said pulverizer frames, each of said banks of tines extending transversely with respect to said framework.

12. A planting apparatus comprising:
    a framework having a forward side and a rear side;
    a plurality of plow assemblies mounted on the forward side of said framework and transversely spaced thereacross for making spaced furrows in the earth;
    bedding plates mounted between said plow assemblies with each bedding plate extending between a pair of adjacent plow assemblies for forming seed beds between furrows;
    a fluid distribution system mounted on said framework rearwardly from said plow assemblies and extending transversely on said framework for distributing fluid agronomical agents on soil from a common source;
    seed hoppers mounted on the upper side of said framework;
    planter disks supported on said framework at locations rearwardly from said distribution system and in alignment with said bedding plates;
    means for conveying seeds from said seed hoppers to said planter disks;
    means for placement of a protective chemical immediately over seeds planted by said planter disks;
    a plurality of pulverizer frames pivotally connected to said frame for pivotation about horizontal axes;
    pulverizer tines rotatably mounted in each of said pulverizer frames for rotation about horizontal axes;
    a plurality of gauge wheel supporting arms each having a forward end pivotally connected to said framework;
    means for adjusting the inclination of each gauge wheel supporting arm with respect to the horizontal; and
    a gauge wheel rotatably mounted on the opposite end of each of said supporting arms from the end thereof pivotally connected to said framework.

13. A planting apparatus comprising:
    a framework having a forward side and a rear side;
    a plurality of plow assemblies mounted on the forward side of said framework and transversely spaced thereacross for making spaced furrows in the earth;
    bedding plates mounted between said plow assemblies with each bedding plate extending between a pair of adjacent plow assemblies for forming seed beds between furrows;
    a fluid distribution system mounted on said framework rearwardly from said plow assemblies and extending transversely on said framework for distributing fluid agronomical agents on the soil from a common source;
    seed hoppers mounted on the upper side of said framework;
    planter disks supported on said framework at locations rearwardly from said distribution system and in alignment with said bedding plates;
    means for conveying seeds from said seed hoppers to said planter disks;
    means for placement of a protective chemical immediately over seeds planted by said planter disks;
    a plurality of elongated pulverizer frames extending in a rearward direction on said framework, and each having a forward end pivotally connected to said framework for pivotation about a horizontal axis to elevate and lower the other end of each of said pulverizer frames;

pulverizer tines rotatably mounted in each of said pulverizer frames at said other end thereof for rotation about a horizontal axis;

a plurality of gauge wheel supporting arms each having a forward end pivotally connected to said framework;

means for adjusting the inclination of each gauge wheel supporting arm with respect to the horizontal;

a gauge wheel rotatably mounted on the opposite end of each of said supporting arms from the end thereof pivotally connected to said framework;

a first sprocket connected to each of said gauge wheels for rotation therewith;

a chain drivingly engaging said sprocket;

a seed pickup disk associated with each of said seed hoppers; and means drivingly interconnecting said chain and seed pickup disk for driving said disk in rotation.

14. A planting apparatus as defined in claim 13 wherein said means for placement of a protective chemical comprises:

hopper means mounted on said framework rearwardly from said seed hoppers for containing a fungicidal chemical;

spreader heads mounted in said apparatus ahead of said pulverizer tines and positioned for depositing said fungicidal chemical on the surface of the earth immediately over the location where said planter discs plant said seeds, and immediately ahead of the point of contact of said pulverizer tines with the earth; and tubular means for conveying said fungicidal chemical from said hopper means to said spreader heads.

15. A planting apparatus as defined in claim 14 wherein each of said plow assemblies comprises:

a plow blade;

side plates;

wing plates interconnecting said side plates with said plow blade;

a bottom plate interconnecting said side plates and extending substantially horizontally; and a mounting bar having one end detachably connected to said bottom plate, and having a second end detachably and adjustably connected to said framework to facilitate raising and lowering said plow assemblies in a vertical direction.

16. A planting apparatus as defined in claim 15 and further characterized to include row marker assemblies pivotally mounted on opposite sides of said framework.

17. A planting apparatus as defined in claim 16 wherein each of said pulverizer frames is of U-shaped configuration and includes parallel legs each pivotally connected at one end thereof to said framework; and wherein there are two banks of said tines rotatably mounted between the legs of each of said pulverizer frames, each of said banks of tines extending transversely with respect to said framework and the tines in each bank being transversely staggered in offset relation with respect to the tines in the other of said two banks whereby said fungicidal chemical can gravitate through holes made by said tines into immediate proximity to seeds planted by said planter discs.

18. A planting apparatus comprising:

a framework having a forward side and a rear side;

a plurality of plow assemblies mounted on the forward side of said framework and transversely spaced thereacross for making spaced furrows in the earth, each of said plow assemblies comprising:

a plow blade;

wing plates supporting the plow blades;

side plates connected to the wing plates;

a bottom plate interconnecting said side plates; and a mounting bar having one end detachably connected to said bottom plate and having a second end detachably and adjustably connected to said framework;

bedding plates mounted between said plow assemblies, with each bedding plate extending between a pair of adjacent plow assemblies for forming seed beds between furrows;

a fluid distribution system mounted on said framework rearwardly from said plow assemblies and extending transversely on said framework for distributing fluid agronomical agents on the soil from a common source;

seed hoppers mounted on the upper side of said framework;

planter disks supported on said framework at locations rearwardly from said distribution system and in alignment with said bedding plates;

means for conveying seeds from said seed hoppers to said planter disks;

means for placement of a protective chemical immediately over seeds planted by said planter disks; and pulverizer means connected to said framework and extending downwardly and rearwardly therefrom in alignment with said bedding plates.

19. A planting apparatus comprising:

a framework having a forward side and a rear side;

a plurality of plow assemblies mounted on the forward side of said framework and transversely spaced thereacross for making spaced furrows in the earth;

bedding plates mounted between said plow assemblies with each bedding plate extending between a pair of adjacent plow assemblies for forming seed beds between furrows;

a fluid distribution system mounted on said framework rearwardly from said plow assemblies and extending transversely on said framework for distributing fluid agronomical agents on the soil from a common source;

seed hoppers mounted on the upper side of said framework;

planter disks supported on said framework at locations rearwardly from said distribution system and in alignment with said bedding plates;

means for conveying seeds from said seed hoppers to said planter disks;

means for placement of a protective chemical immediately over seeds planted by said planter disks;

pulverizer means connected to said framework and extending rearwardly and downwardly therefrom in alignment with said bedding plates;

a plurality of gauge wheel supporting arms each having a forward end pivotally connected to said framework;

means adjusting the inclination of each of the gauge wheel supporting arms with respect to the horizontal;

a gauge wheel rotatably mounted on the opposite end of said supporting arm from the end thereof pivotally connected to said framework;

seed feeding means connected between said seed hoppers and said gauge wheels for controlling the rate at which seeds are discharged from said seed hoppers into said conveying means, said seed feeding means comprising:

a first sprocket connected to each of said gauge wheels for rotation therewith;

a chain drivingly engaging said sprocket;

a seed pickup disk associated with each of said seed hoppers; and means drivingly interconnecting said chain and seed pickup disk for driving said disk in rotation.

20. A planting apparatus comprising:

a framework having a forward side and a rear side;

a plurality of plow assemblies mounted on the forward side of said framework and transversely spaced thereacross;

bedding means mounted between said plow assemblies;

a fluid distribution system mounted on said framework rearwardly from said plow assemblies and extending transversely on said framework for distributing chemical agents on the soil;

seed hoppers mounted on the upper side of said framework;

planter means mounted on said framework at a location rearwardly from said fluid distribution system in alignment with said bedding means;

means for conveying seeds from said seed hoppers to said planter disks; and a plurality of elongated pulverizer frames, each pivotally connected at one end to said framework for pivotation about horizontal axes to raise and lower the other end of said pulverizer frames; and pulverizer tines rotatably mounted in each of said pulverizer frames at said other end of said pulverizer frames for rotation about horizontal axes.

* * * * *